United States Patent [19]
Borromeo

[11] Patent Number: 5,197,350
[45] Date of Patent: Mar. 30, 1993

[54] HANDLEBAR, PARTICULARLY FOR CYCLES, SUCH AS, FOR EXAMPLE, BICYCLES

[75] Inventor: Lucio Borromeo, Turin, Italy

[73] Assignee: 3 T S.p.A., Turin, Italy

[21] Appl. No.: 858,188

[22] Filed: Mar. 26, 1992

[30] Foreign Application Priority Data

Jul. 15, 1991 [IT] Italy .................. 000553 A/91

[51] Int. Cl.⁵ .................. B62K 21/12; F16B 1/00
[52] U.S. Cl. .................. 74/551.8; 74/551.1; 74/551.3; 403/205; 403/382
[58] Field of Search .................. 403/205, 382; 74/551.1–551.9

[56] References Cited

U.S. PATENT DOCUMENTS

| | | | |
|---|---|---|---|
| 4,479,646 | 10/1984 | Chirapozu | 74/551.8 |
| 4,624,599 | 11/1986 | Piasecki | 403/382 |
| 4,750,754 | 6/1988 | Lennon | 74/551.1 X |
| 4,771,649 | 9/1988 | Modolo | 74/551.1 |
| 4,951,525 | 8/1990 | Borromeo | 74/551.1 |
| 5,000,469 | 3/1991 | Smith | 74/551.1 |
| 5,033,325 | 7/1991 | Giard | 74/551.3 |
| 5,094,124 | 3/1992 | Stonehouse | 74/551.8 |
| 5,094,322 | 3/1992 | Casillas | 74/551.8 |

Primary Examiner—Vinh T. Luong
Attorney, Agent, or Firm—Sughrue, Mion, Zinn, Macpeak & Seas

[57] ABSTRACT

A handlebar, particularly for cycles, such as, for example, bicycles, is of the type including formations for supporting the cyclist's elbows. The support formations are mounted on the rear ends of side elements of the handlebar which project rearwardly and outwardly from the main cross member of the handlebar which is intended to be connected to the steering column. When the cyclist grips the front ends of the handlebar, he can thus rest his elbows in the formations, keeping his elbows spaced apart in a position generally to the rear of the cross member of the handlebar. The preferred application of the handlebar is to sports cycles.

4 Claims, 1 Drawing Sheet

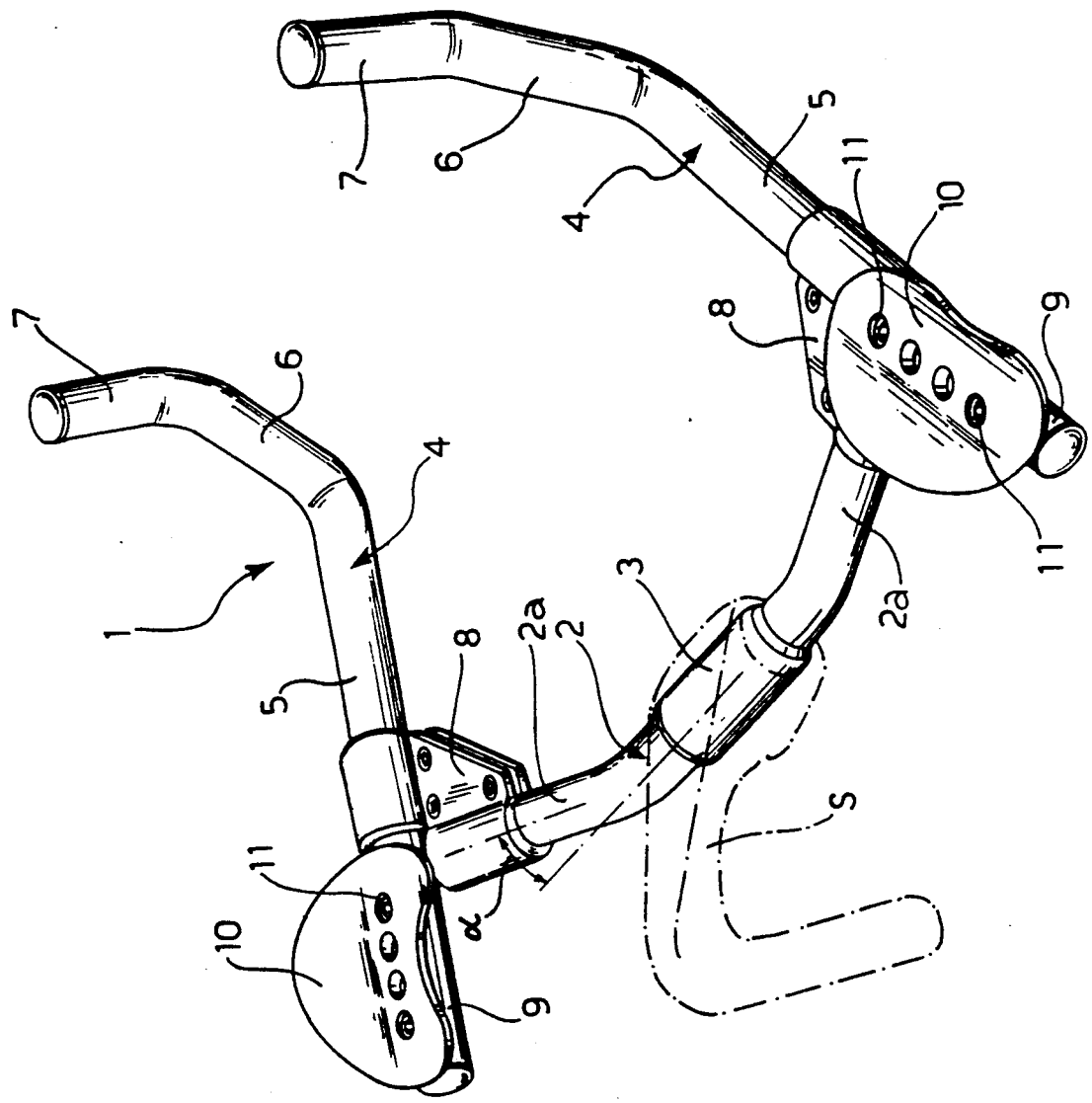

HANDLEBAR, PARTICULARLY FOR CYCLES, SUCH AS, FOR EXAMPLE, BICYCLES

BACKGROUND OF THE INVENTION

The present invention relates to handlebars for vehicles and has been developed with particular attention to its possible application to handlebars for cycles such as, for example, sports bicycles.

The present invention relates specifically to handlebars with formations for supporting the elbows of the person steering the vehicle, typically a cycle, to which the handlebar is fitted In this connection, U.S. Pat. No. 4,951,525 assigned to the same assignee of the present application may be mentioned by way of reference. This prior patent describes a handlebar for cycles, particularly bicycles for triathlons and time trials, including a cross member, the centre of which can be connected to a steering column, and which has two side extensions extending forwardly and converging inwardly of the handlebar. Two further extensions project upwardly from the side extensions and are connected by a further transverse element.

The handlebar described in this prior patent therefore preferably has a generally annular configuration and thus allows for at least four different gripping positions. In particular, at least in some particularly far forward gripping positions, the cyclist's elbows in practice rest on the handlebar which has suitable formations for this purpose, constituted, for example, by small pieces of soft material (cloth, artificial leather) or shaped elements, for example, of plastics material, of a generally cup-shaped configuration, in which the athlete can rest his elbows With these handlebars, which are intended preferably for sports use, (competitive or non-competitive) it is found, in use, that the arrangement in which the elbows are supported inwardly of the handlebar may not be agreeable or advantageous, both because the elbows are brought too close together (which is not usually agreeable for an athlete who is exerting himself) and because, if his elbows are moved generally beyond the main cross member of the handlebar, the cyclist's body may be projected too far forwards.

SUMMARY OF THE INVENTION

The object of the present invention is to provide a handlebar which certainly overcomes the aforementioned problems.

According to the present invention, this object is achieved by virtue of a handlebar having the specific characteristics recited in the following claims In this connection, it should be noted that the term "handlebar" as used in the following claims is not only intended—in a strict sense—to identify the entire assembly of elements (the main cross member, any side elements, etc.) which is fitted to the steering column of a vehicle in order to enable it to be steered, but may also very well apply to a set of fittings or a "kit" to be fitted to a base structure (for example, a central handlebar portion) so that, as a whole, it forms a steering element for a vehicle. Such sets of fittings or kits are therefore certainly included in the scope of the present patent.

Moreover, the term "elbows" as used in the present description and in the following claims is naturally not intended to be limited to the elbow in a strictly anatomical sense; on the contrary, this term also extends to the immediately adjacent portions of the forearms.

BRIEF DESCRIPTION OF THE DRAWINGS

The invention will now be described, purely by way of non-limiting example, with reference to the appended drawing which shows schematically and in perspective a handlebar formed according to the invention.

DETAILED DESCRIPTION OF THE INVENTION

In the drawing, a handlebar, generally indicated 1, is constituted, by way of example, by a handlebar for a cycle such as a sports bicycle (not shown as a whole)

Essentially, the handlebar includes three main elements made of metal tubing (for example, of light alloy) by widely known forming or bending techniques.

The first element in question is constituted by a member 2 which is intended to be connected, preferably by means of a central, reinforced and thickened portion 3, to a handlebar supports(usually known in the sector as a "stem") which enables the handlebar 1 to be fixed to the steering column of the cycle (not shown), the member 2 being oriented generally transverse the direction of travel of the cycle.

The cross member 2 extends generally in a straight line from the central part 3. More precisely, in a currently-preferred embodiment, the central element 2 has two lateral end portions 2a which are substantially straight but are bent forwards (still with reference to the normal direction of travel of the cycle) at an angle $\alpha$ of the order of 15-20° to the central part 3.

By way of dimensional reference, the straight central part 3 of the member 2 is usually about twice as long as each of the lateral portions 2a (measured along its main axis).

The other two main elements of the handlebar 1 are constituted by two side elements 4 which are intended to form the side loops of the handlebar. Each of the side elements 4 includes:

- a main, straight portion 5 which is intended to be kept substantially horizontal in use,
- an intermediate portion 6 which forms an extension of the main portion 5 and which, in use, is intended to be turned upwards (at an angle of inclination to the horizontal of the order of 40–45°), and
- an end portion 7 which forms an extension of the intermediate portion 6 and which, in use, is intended to be oriented substantially upwardly with, at most, a slight rearward inclination towards the main cross member 2 of the handlebar.

The two side elements 4 and the cross member 2 of the handlebar are connected (in a generally specularly symmetrical arrangement with respect to the central median plane of the handlebar which is defined substantially by the vertical median plane of the reinforced portion 3) by brackets or connection plates 8, for example, of pressed light alloy, with perpendicular sleeve formations, one for housing the free end of one of the portions 2a of the cross member 2 and the other for housing the central portion of the main portion 5 of the corresponding side element 4. The portions 2a and the portions 5 are thus connected approximately in correspondence with the centres of the portions 5 in a generally T-shaped arrangement A considerable part, indicated 9 in the appended drawings, of each portion 5 thus extends "behind" or "to the rear of" the cross member 2 of the handlebar. Naturally, the term "behind" or to the rear of should be interpreted with reference to the normal position in which the handlebar 1 is mounted on the cycle and to the normal direction of advance thereof; the portions 6 and 7 of the side elements 4 are thus "in front" or "forward" of the cross member 2.

Moreover, because of the generally forward inclination of the portions 2a (at an angle α to the central portion 3 of the cross member 2) the two side elements 4 of the handlebar (and, in particular, the front portions 6 and 7) converge, generally in the normal direction of advance of the cycle. Conversely, the two end parts 9 extend rearwardly from the cross member 2 like structural brackets projecting outwardly from the handlebar in a generally diverging arrangement.

Two formations 10 for supporting the cyclist's elbows are mounted on the end parts 9 (by known means, for example, by screws 11 which engage corresponding holes in the tubes constituting the side elements 4 of the handlebar) and are thus located generally to the rear of the cross member 2 of the handlebar 1, spaced apart by a distance at least slightly greater than the overall length (width) of the cross member 2.

When the cyclist grips the front portions 6 and 7 of the handlebar (on which the braking and the gear-changing controls of the cycle, not illustrated, are normally disposed) he can thus easily rest his elbows, or the portions of his forearms immediately adjacent his elbows, on the support formations 10 to benefit from a riding position in which his elbows are quite spread out (and are not forced towards the centre of the handlebar) and, at the same time, are supported to the rear of the cross member 2 and hence in positions nearer to the cyclist's body As a result, the cyclist can adopt a physiologically and ergonomically more advantageous and comfortable position for riding the cycle.

Moreover, it will be appreciated that, because the end portions 2a of the cross member 2 of the handlebar are inclined generally forwards (at the angle α), the spatial orientations of the portions 2a can be changed by pivoting the cross member 2 generally about the horizontal axis of the central portion 3 relative to the support S which houses it, thus selectively varying the spatial orientations (the general inclination and angle of convergence) of the side elements 4 of the handlebar. All this, together with the generally movable connection of the brackets 8 to the elements 2 and 4 (for example, by means of screws in a generally clamp-like configuration), enables the shape of the handlebar to be adapted further to the anthropometric characteristics and riding tastes of the cyclist.

Naturally, the principle of the invention remaining the same, the details of construction and forms of embodiment may be varied widely with respect to those described and illustrated, without thereby departing from the scope of the present invention.

What is claimed is:

1. A handlebar for a cycle comprising a cross member having a central portion adapted to be connected to a steering column of the cycle, two side elements connected to opposite ends of the cross member respectively in a T-shaped configuration with each side element having a front portion projecting forwardly of the cross member and a rear portion projecting rearwardly of the cross member and two support formations for supporting the elbows of a cycle rider, each connected to the rear portion of each side element wherein said support formations are located substantially rearwardly of the cross member and wherein the cross member has a given length and a distance between the support formations is at least slightly greater than the given length.

2. A handlebar as set forth in claim 1 wherein said cross member has two lateral portions which are bent generally forwardly from the central portion of the cross member and each side element is connected to an outer end of each lateral portion so that the front portions of the side elements converge generally inwardly of the handlebar in a forward longitudinal direction.

3. A handlebar as set forth in claim 2, wherein the front portion of each side element has an upwardly curved forward end portion to provide gripping means.

4. A handlebar as set forth in claim 1, wherein each side element is connected to the cross member by a bracket having releasable clamping means engaging said side element and said cross member.

* * * * *